(12) United States Patent
Minaguchi et al.

(10) Patent No.: US 6,992,884 B2
(45) Date of Patent: Jan. 31, 2006

(54) DISPLAY DEVICE AND ELECTRONIC APPARATUS PROVIDED WITH THE SAME

(75) Inventors: Hiroyuki Minaguchi, Higashimatsuyama (JP); Nobuyasu Tajima, Ome (JP); Masanori Sato, Ome (JP); Hidemi Itakura, Nishitama-gun (JP); Takayuki Arisaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 10/766,524

(22) Filed: Jan. 29, 2004

(65) Prior Publication Data

US 2004/0240165 A1 Dec. 2, 2004

(30) Foreign Application Priority Data

Jan. 31, 2003 (JP) .............................. 2003-023876

(51) Int. Cl.
*G06F 1/16* (2006.01)

(52) U.S. Cl. ...................................... 361/683; 361/681
(58) Field of Classification Search ................ 361/681, 361/683
See application file for complete search history.

(56) References Cited

U.S. PATENT DOCUMENTS

| | | | | |
|---|---|---|---|---|
| 5,844,774 A | * | 12/1998 | Gushiken et al. | ........... 361/681 |
| 6,002,582 A | * | 12/1999 | Yeager et al. | ................ 361/681 |
| 6,064,565 A | * | 5/2000 | Ishihara et al. | ............. 361/681 |
| 6,128,183 A | * | 10/2000 | Uchiyama et al. | .......... 361/681 |
| 6,202,256 B1 | * | 3/2001 | Bovio et al. | ................. 361/681 |
| 6,212,067 B1 | * | 4/2001 | Nakajima et al. | ........... 361/681 |
| 6,411,501 B1 | * | 6/2002 | Cho et al. | .................... 361/681 |
| 6,671,012 B1 | * | 12/2003 | Tanaka | ....................... 361/681 |
| 6,859,357 B2 | * | 2/2005 | Morimoto et al. | .......... 361/681 |
| 6,937,297 B2 | * | 8/2005 | Kang et al. | ................. 361/681 |

FOREIGN PATENT DOCUMENTS

JP 2002-328622 11/2002

* cited by examiner

*Primary Examiner*—Lisa Lea-Edmonds
(74) *Attorney, Agent, or Firm*—Pillsbury Winthrop Shaw Pittman, LLP

(57) ABSTRACT

A display device including a housing having a support wall and an opening opposite to the support wall, a display unit provided in the housing, and having a display screen exposed through the opening, and one pair of brackets provided between lateral sides of the display main unit. Each of the pair of brackets includes a pair of first portions fixed to the display unit, a connecting portion connecting the pair of first portions, and a second portion provided on the connecting portion and fixed to the housing, wherein the connecting portion being elastically deformable between a side of the display unit and the housing. An electronic apparatus with the display device includes a main body having a data processor, data processed by the processor being displayed on the screen.

20 Claims, 3 Drawing Sheets

DISPLAY DEVICE AND ELECTRONIC APPARATUS PROVIDED WITH THE SAME

CROSS-REFERENCE TO RELATED APPLICATIONS

This application is based upon and claims the benefit of priority from the prior Japanese Patent Application No. 2003-023876, filed Jan. 31, 2003, the entire contents of which are incorporated herein by reference.

BACKGROUND OF THE INVENTION

1. Field of the Invention

The present invention relates to a display device and an electronic apparatus provided with the display device, and more particularly, it relates to a display device comprising a housing having an opening and a display main unit housed in the housing and having a display screen exposed in the opening, and an electronic apparatus provided with the display device.

2. Description of the Related Art

For example, a liquid crystal display (LCD) device is well known as the above-described display device, and a portable computer is well known as an electronic apparatus provided with the display device.

Japanese Patent Application KOKAI Publication No. 2002-328622 discloses the portable computer provided with the liquid crystal display device.

This known liquid crystal display device includes an LCD main unit and a box-shaped housing in which the LCD main unit is housed. The LCD main unit has a substantially flat rectangular shape, and a display screen for displaying an image is disposed on one surface of the LCD main unit. A frame is attached to an outer periphery of the LCD main unit. The frame surrounds the display screen, and an effective display region of the display screen is defined by the frame.

The housing comprises a back cover and a mask detachably connected to the back cover. The back cover includes a support wall which supports the LCD main unit, and bosses are formed at a plurality of predetermined positions on an inner surface of the support wall. The mask has a square opening opposite to the support wall. Brackets are attached to both side portions of the frame of the LCD main unit. These brackets are fixed to the bosses at the plurality of predetermined positions on the inner surface of the support wall of the back cover by known fixing members such as screws and, as a result, the display screen of the LCD main unit is exposed to an outer space through the opening of the mask.

The brackets attached to the both side portions of the frame of the LCD main unit have the same configuration. Each of the brackets includes: two first fixed portions fixed to the bosses formed on two predetermined positions on the inner surface of the support wall between opposite ends of one or another of the both side portions of the frame of the LCD unit in a longitudinal direction of one or another of the both side portions; two second fixed portions fixed to the opposite ends of one or another of the both side portions of the frame of the LCD unit in the longitudinal direction; and a connecting portion which connects the first fixed portions to the second fixed portions and which is elastically deformable in a direction extending along the display screen of the LCD unit and intersecting with the both side portions.

In the above-described known LCD main unit, even if the dimension between the both side portions of the frame of the LCD main unit is different from that between the both side edges of the opening of the mask, a center of the display screen of the LCD main unit substantially automatically can be located at the center of the opening of the mask, owing to the elastic deformations of the connecting portions of the pair of brackets.

However, in the conventional known bracket, the two first fixed portions are disposed apart from each other in the longitudinal direction between the opposite ends of one or another side portion of the frame of the LCD main unit. Therefore, a part of the connecting portion, which extends between each of the two second fixed portions fixed to the opposite ends and each of the two first fixed portions disposed in the vicinity of each second fixed portion, is comparatively short in the longitudinal direction.

As a result, each short part of the connecting portion of each bracket can elastically deformable only in a small range in the direction extending along the display screen of the LCD main unit and intersecting with the both side portions of the frame. Further, when the two first fixed portions of each bracket located between the opposite ends thereof are fixed to two bosses on the inner surface of the back cover, external forces loaded onto the connecting portion from the two first fixed portions are not substantially equal to each other in each of the two brackets. And, it is difficult to constantly easily dispose the center of the display screen of the LCD main unit to the center of the opening of the mask with a high precision in the known display device using the conventional brackets.

BRIEF SUMMARY OF THE INVENTION

According to an aspect of the present invention, a display device comprises: a housing having a support wall and an opening opposite to the support wall; a display unit provided in the housing, and having a display screen exposed through the opening; and one pair of brackets provided between lateral sides of the display main unit. Each of the pair of brackets includes: a pair of first portions fixed to the display unit; a connecting portion connecting the pair of first portions; and a second portion provided on the connecting portion and fixed to the housing. The connecting portion is elastically deformable between a side of the display unit and the housing.

According to another aspect of the present invention, an electronic apparatus comprises: a main body assembly including a data processing device; and a display device displaying data processed by the data processing device. The display device comprises: a housing having a support wall and an opening opposite to the support wall; a display unit provided in the housing, and having display screen exposed in the opening; and one pair of brackets provided between lateral sides of the display unit. Each of the pair of brackets includes; a pair of first portions fixed to the display unit; a connecting portion connecting the pair of first portions; and a second portion provided on the connecting portion and fixed to the housing. The connecting portion is elastically deformable between a side of the display unit and the housing.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Figure 1:
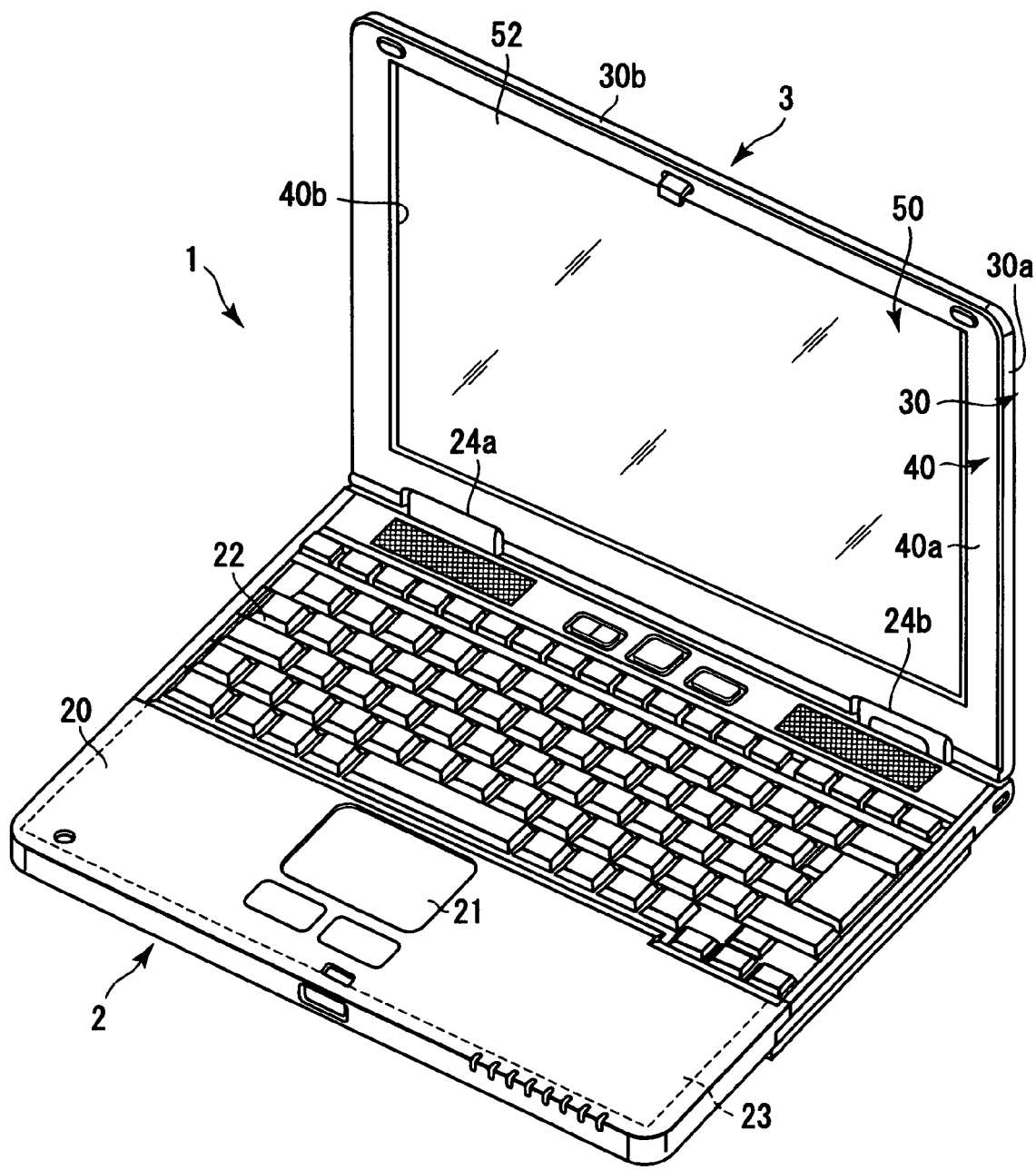
FIG. 1 is a perspective view of a whole of a portable computer which is one type of an electronic apparatus according to one embodiment of the present invention, in which a display device including a liquid crystal display unit is openably/closably connected to a main body assembly including a data processing device, and the display device is disposed in an open position with respect to the main body assembly.

One embodiment of the present invention will be described in detail with reference to the accompanying drawings. First, referring to FIG. 1, a perspective view of a whole portable computer 1 which is one type of an electronic apparatus according to one embodiment of the present invention is shown. In the present embodiment, the portable computer 1 comprises a main body assembly 2, and a liquid crystal display (LCD) device 3 which is one type of a display device, and the LCD device 3 is openably/closably connected to the main body assembly 2. This portable computer 1 is generally referred to as a laptop type. In FIG. 1, the LCD device 3 is located in an open position with respect to the main body assembly 2.

The main body assembly 2 includes an outer housing 20 having a substantially flat square box shape, and an input device for inputting data is disposed on an upper surface of the outer housing 20, which is opposite to the LCD device 3. The input device includes a touch panel 21 and a keyboard 22. A data processing device 23 which processes data inputted by the input device is housed in the outer housing 20. The data processing device 23 can include various information recording medium handling devices such as a hard disc (HD) unit, a compact disc (CD) unit, and a digital versatile disc (DVD) unit. The LCD device 3 displays the data processed by the data processing device 23. A battery and a connecting device for connecting with an external power supply are also housed in the outer housing 20. Various externally exposed devices for operating the main body assembly 2 are further arranged on the upper surface of the outer housing 20, and these externally exposed devices include a sound generation device such as a speaker, various switches, and various alarm display lamps.

Two support legs 24a, 24b are formed on a rear edge of the outer housing 20, and the support legs 24a, 24b are separated from each other at a predetermined distance in an extending direction of the rear edge. The LCD device 3 is rotatably connected to these support legs 24a, 24b, and the LCD device 3 is electrically connected to the data processing device 23 through these support legs 24a, 24b.

The LCD device 3 is rotatable around the support legs 24a, 24b between an open position shown in FIG. 1 and a closed position where the device 3 overlaps the upper surface of the outer housing 20 to cover the input device including the touch panel 21 and keyboard 22 on the upper surface.

The LCD device 3 comprises a housing including a back cover 30 which is a first cover and a mask 40 which is a second cover connected to the back cover 30, and a liquid crystal display (LCD) unit 50 housed between the back cover 30 and mask 40 of the housing.

The back cover 30 includes a substantially rectangular support wall 30a, and a peripheral wall 30b rising from an outer periphery of the support wall 30a. The mask 40 includes a flat front wall 40a surrounded with the peripheral wall 30b of the back cover 30 and disposed opposite to the support wall 30a, and a substantially rectangular opening 40b is formed in a middle of the front wall 40a. A display screen 52 of the LCD unit 50 is exposed in the opening 40b of the mask 40.

Figure 2:
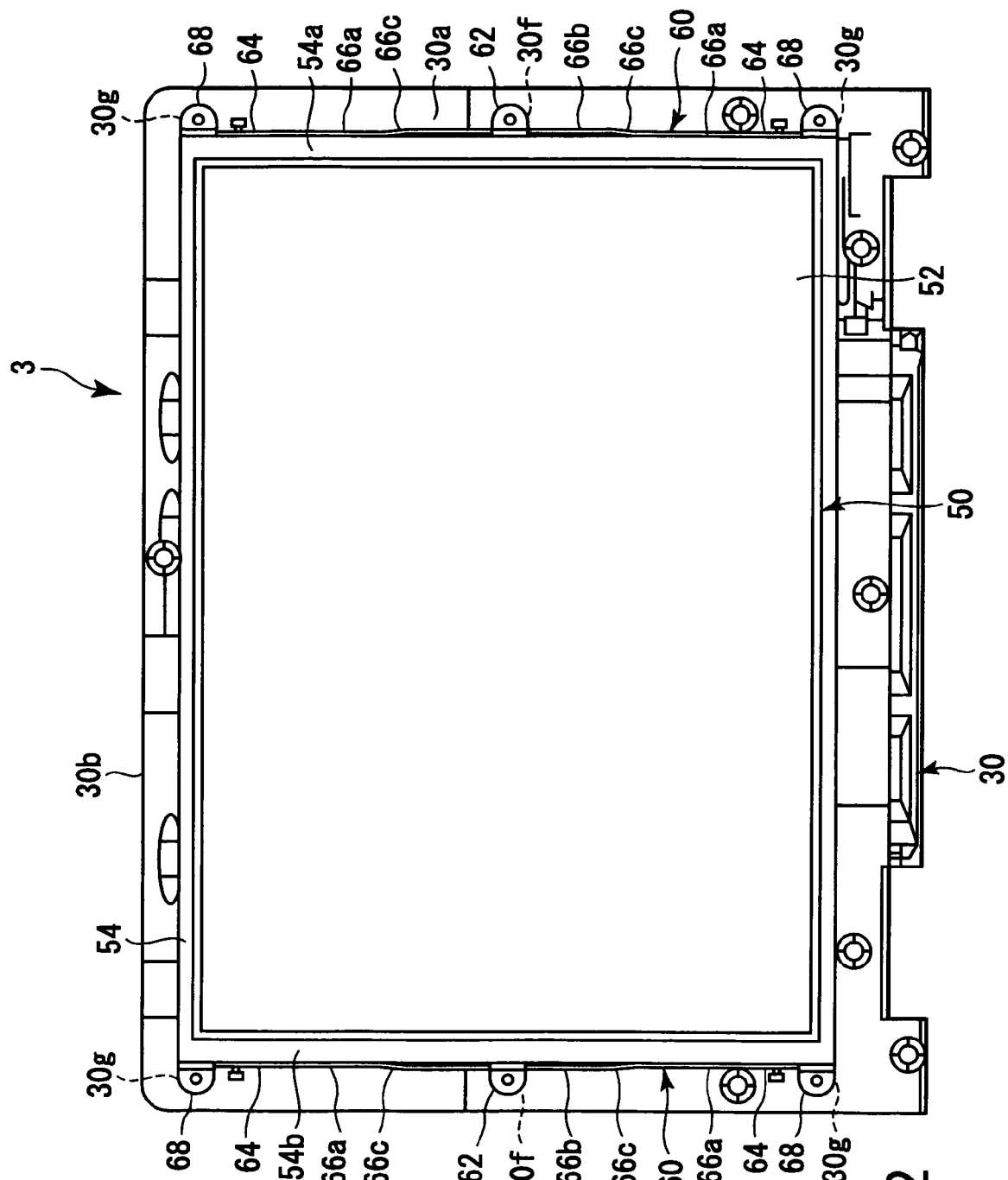
FIG. 2 is a front view of the display device of FIG. 1 from which a mask is removed.

FIG. 2 is a front view showing the LCD device 3 of FIG. 1 from which the mask 40 is removed. As shown in FIG. 2, one first boss 30f and two second bosses 30g, these bosses projecting toward the mask 40, are formed at three predetermined positions located along each of right and left side portions of the peripheral wall 30b on the inner surface of the support wall 30a of the back cover 30. More specifically, the first boss 30f is positioned substantially at a center of each of the right and left side portions in an extending direction of each of the right and left side portions, and includes an engaging protrusion at its center. The two second bosses 30g are positioned at both ends of each of the right and left side portions in the extending direction thereof, and each of the second bosses 30g has a screw hole in its center.

The LCD unit 50 has a flat rectangular shape, and has a predetermined height (dimension in a vertical direction in FIGS. 1 and 2), and a predetermined width (dimension in a horizontal direction in FIGS. 1 and 2) which is larger than the height. One plane of the LCD unit 50 is configured as the rectangular display screen 52 on which the data processed by the data processing device 23 of the main body assembly 2 is displayed as images such as characters, numerals and the other symbols.

A metal frame 54 is attached to the outer periphery of the square shaped LCD main unit 50, and the frame 54 surrounds the display screen 52 to define an effective display region of the display screen 52.

One pair of brackets 60 are disposed on two opposite side portions 54a and 54b of the frame 54, separated from each other in the horizontal direction and extending in the vertical direction. The paired brackets 60 are the same as to each other, and are formed, for example, of a stainless steel. The LCD unit 50 is fixed to a predetermined position on the support wall 30a of the back cover 30 with these brackets 60.

Figure 3:
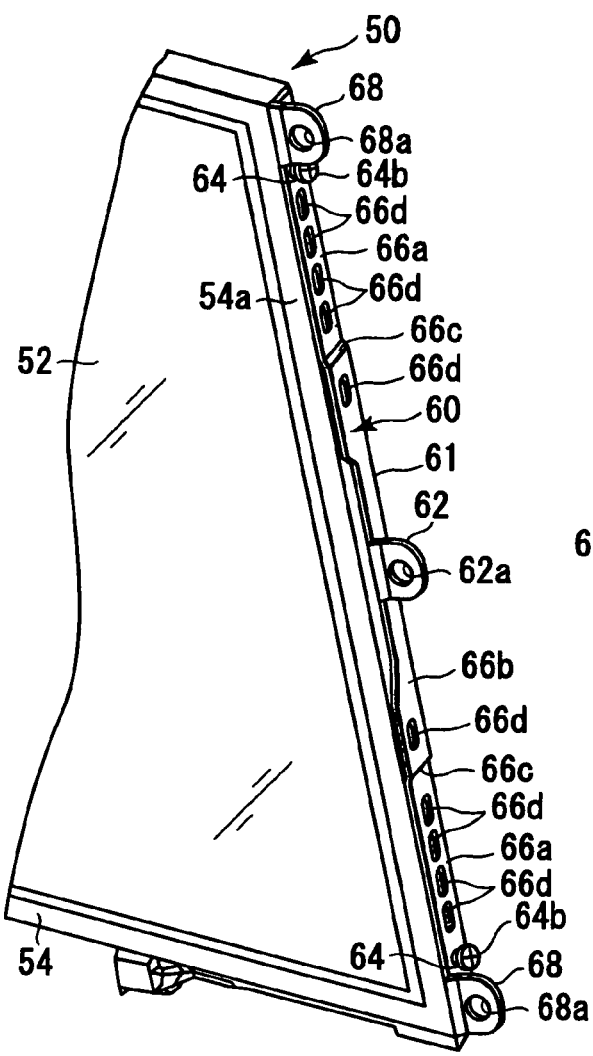
FIG. 3 is a perspective view showing a bracket disposed on one of right and left side portions of a frame attached to an outer periphery of an LCD unit included in the display device of FIG. 1.

Next, the brackets 60 will be described in detail with reference to FIGS. 3 to 5. FIG. 3 is a perspective view showing the bracket 60 disposed on the right side portion 54a of the frame 54 attached to the outer periphery of the LCD unit 50 included in the LCD device 3 of the portable computer 1 in FIG. 1, FIG. 4 is an enlarged front view of the bracket 60 of FIG. 3, and FIG. 5 is an enlarged right side view of the bracket 60.

As shown in FIG. 3, the bracket 60 includes a connecting portion 61 having an elongated plate shape and extending over the total length of the right side portion 54a. Therefore, the longitudinal direction of the bracket 60 corresponds to the vertical (height) direction of the LCD unit 50, and crosses the horizontal (width) direction of the LCD unit 50 at right angles. Moreover, in the present embodiment, the length of the bracket 60 is substantially equal to that of the right side portion 54a of the frame 54.

Figure 4:
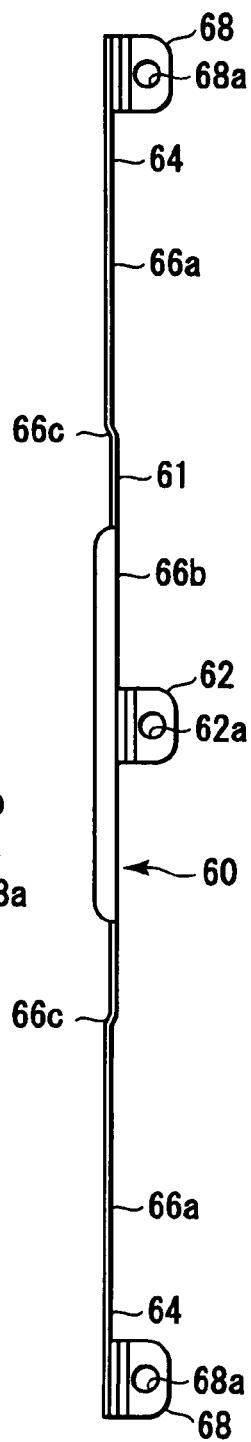
FIG. 4 is an enlarged front view of the bracket of FIG. 3.
Figure 5:
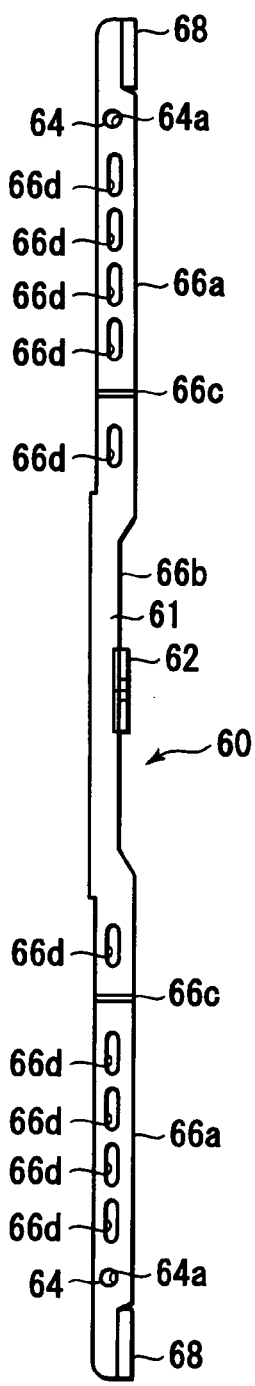
FIG. 5 is an enlarged right side view of the bracket of FIG. 3.

As shown in FIGS. 3 and 4, a second portion 62 is formed at a center of the connecting portion 61 of the bracket 60 in its longitudinal direction. The second portion 62 has a flange which protrudes in a direction extending along the display screen 52 and substantially crossing the longitudinal direction at right angles, and a through hole 62a is formed in the second fixed portion 62. The through hole 62a is directed in a direction crossing the display screen 52 at right angles.

First portions 64 are disposed at two positions remote toward the both ends of the connecting portion 61 of the bracket 60 in its longitudinal direction from the second portion 62 at a predetermined distance. In the present embodiment, the first portions 64 are positioned on the both ends of the connecting portion 61 in its longitudinal direction. As shown in FIG. 5, through holes 64a are formed in the respective first portions 64. The through holes 64a are directed in a direction extending along the display screen 52 and toward the right side portion 54a of the frame 54.

Further, third portions 68 are formed on the both ends of the connecting portion 61 of the bracket 60 in its longitudinal direction. The third portions 68 are located on the outsides of the first portions 64 in the longitudinal direction and adjacent to the first portions 64, respectively. The third portions 68 have flanges which protrude in the same manner as the flange of the second portion 62, and through holes 68a directed in a direction crossing the display screen 52 at right angles are formed in the third portions 68. The through hole 68a of the third portion 68 is larger than the through hole 62a of the second portion 62. In the present embodiment, the former through hole 68a has a diameter of about 3.5 mm, and the latter through hole 62a has a diameter of about 2.5 mm.

As shown in FIG. 4, the two first portions 64 of the bracket 60 are fixed to the predetermined positions on the both ends of the right side portion 54a of the frame 54 in the vertical (height) direction by fixing screws 64b inserted in the through holes 64a of the two first portions 64. With this fixation, the connecting portion 61 bends substantially in an arch shape, and the second portion 62 at the center of the connecting portion 61 in its longitudinal direction is disposed outward from the right side portion 54a of the frame 54 at a predetermined distance in the horizontal (width) direction of the display screen 52. Accordingly, the connecting portion 61 is elastically deformable in the direction extending along the display screen 52 of the LCD unit 50 and intersecting with the longitudinal direction of the connecting portion 61.

That is, since the paired brackets 60 have the same constitution as described above, the connecting portions 61 of the paired brackets 60 generate the same elastic force in opposite directions while the two first portions 64 of each bracket 60 are fixed to the predetermined positions of the both ends of each of the right and left side portions 54a, 54b of the frame 54 in the vertical (height) direction by the fixing screws 64b.

In the present embodiment, the connecting portion 61 includes two opposite end parts 66a including the third portions 68 on the both ends, the first portions 64 and vicinities of the first portions 64, a middle part 66b including the second portion 62, and two stepped portions 66c disposed between one of the two opposite end parts 66a and the middle part 66b and between another of the two opposite end parts 66a and the middle part 66b. The two stepped portions 66c of the connecting portion 61 are separated from the second portion 62 at an equal distance in the longitudinal direction, and the two stepped portions 66c and the two opposite end parts 66a are symmetrically arranged with respect to the second portion 62 in the longitudinal direction.

The middle part 66b is positioned in the outsides of the two opposite end parts 66a by the two stepped portions 66c with respect to each of the right and left side portions 54a, 54b of the frame 54 in the direction extending along the display screen 52 of the LCD unit 50 and substantially crossing the longitudinal direction of the connecting portion 61 at right angles.

Moreover, as shown in FIGS. 3 and 5, a plurality of holes 66d for reduction of a weight are formed in the connecting portion 61. These holes 66d are equally formed on the both sides of the second portion 62. In the present embodiment, two holes 66d are formed in the middle part 66b, and four holes 66d are formed in each of the opposite end parts 66a.

Next, an assembling procedure of the LCD device 3 configured as described above will be described with reference to FIG. 2.

First, the brackets 60 are attached to the respective right and left side portions 54a, 54b of the frame 54 of the LCD unit 50.

Next, the LCD unit 50 with one pair of brackets 60 is laid on the inner surface of the support wall 30a of the back cover 30. Moreover, the through holes 62a of the second portions 62 of the brackets 60 are engaged with the engaging protrusions at the centers of the two first bosses 30f formed on the centers of the right and left side portions of the support wall 30a in their extending directions, so that the LCD unit 50 is fixed on the inner surface of the support wall 30a of the back cover 30. In this state, the center of the display screen 52 of the LCD unit 50 is located at the center of the support wall 30a of the back cover 30 in the horizontal direction between the two first bosses 30f on the right and left side portions of the inner surface of the support wall 30a of the back cover 30.

Next, the third portions 68 on the both ends of each bracket 60 are fixed to the second bosses 30g on the both ends of each of the right and left side portions of the support wall 30a of the back cover 30 by the fixing screws (not shown) inserted through the through holes 68a of the third portions 68.

Since the diameter of the through hole 68a of the third portion 68 is larger than that of the through hole 62a of the second portion 62 as described above, the center of the display screen 52 of the LCD unit 50 in the horizontal direction does not deflect in the horizontal direction from the center of the two first bosses 30f on the right and left side portions of the support wall 30a of the back cover 30 when the third portions 68 of the both ends of the paired brackets 60 are fixed to the second bosses 30g on four corners of the support wall 30a of the back cover 30 as described above. As a result, the LCD unit 50 is easily fixed to the support wall 30a of the back cover 30, and additionally the display screen 52 is constantly securely arranged in the predetermined position with respect to the support wall 30a of the back cover 30.

Finally, the mask 40 is fitted into a region surrounded with the peripheral wall 30b of the back cover 30, and thus the square frame-shaped front wall 40a of the mask 40 covers a region of the LCD unit 50 located in the outside the frame 54. At the same time, the above-described effective display region surrounded with the frame 54 on the display screen 52 of the LCD unit 50 is exposed to the outer space through the opening 40b of the mask 40, and the assembling of the LCD device 3 is completed. As apparent from the above description, the center of the effective display region in the horizontal direction substantially is located in the center of the opening 40b of the display mask 40 in the horizontal direction.

In the present embodiment, the second portion 62 for fixing the bracket 60 to the support wall 30a of the back cover 30 is disposed at the center located between the two first portions 64 for fixing the bracket 60 to either of the right and left side portions of the frame 54 of the LCD unit 50 on the elastically deformable connecting portion 61 of the bracket 60, and additionally the two first portions 64 are disposed on the both ends of the connecting portion 61 in the longitudinal direction. Therefore, the respective distances between the two first portions 64 and the second portion 62 disposed at the center between them are set to be long on the connecting portion 61, and then the elastic deformation/deflection of the connecting portion 61 can be large in the direction extending along the display screen 52 of the LCD unit 50 and intersecting with the longitudinal direction of the bracket 60. Further, the connecting portion 61 of each bracket 60 includes only one second portion 62 for fixing the bracket 60 to the support wall 30a of the back cover 30 at the center located between the two first portions 64 for fixing the bracket 60 to either of the right and left side portions of the frame 54 of the LCD main unit 50. Therefore, when the second portion 62 is fixed to either of the two first bosses 30f of the right and left side portions of the support wall 30a of the back cover 30, the external forces loaded onto the connecting portions 61 of the two brackets 60 from the second portion 62 is naturally substantially equal to each other in the two brackets 60.

Consequently, the LCD unit 50 can easily be fixed to the support wall 30a of the back cover 30 so as to constantly securely dispose the display screen 52 of the LCD unit 50 in the predetermined position with respect to the support wall 30a of the back cover 30 with the high precision by the pair of brackets 60 of the present embodiment.

Therefore, in the present embodiment, dimensional errors of the display screen 52 of the LCD unit 50 and those of the plurality of predetermined positions for fixing the LCD unit 50 on the support wall 30a of the back cover 30 of the housing are absorbed. The center of the effective display region of the display screen 52 of the LCD unit 50 in the direction extending along the display screen 52 of the LCD unit 50 and intersecting with the longitudinal direction of the bracket 60 can easily be located at the center of the opening 40b of the mask 40 of the housing with the high precision.

The allowable elastic deformation/deflection of the bracket 60 is in proportion to the respective lengths between the two first portions 64 fixed to the frame 54 of the LCD unit 50 and the second portion 62 fixed to the support wall 30a of the back cover 30 of the housing in the connecting portion 61 of the bracket 60 or, in the present embodiment, the length of the connecting portion 61 in its longitudinal direction, and further the dimension of the display screen 52 of the LCD unit 50 in the vertical direction in FIGS. 1 and 2 or the length of each of the right and left side portions of the frame 54 of the LCD unit 50, to which the brackets 60 are attached. Therefore, the allowable elastic deformation/deflection of the bracket 60 can be increased as the vertical dimension of the vertical direction of the display screen 52 of the LCD unit 50 provided with the brackets 60 in FIGS. 1 and 2 becomes larger.

The display screen 52 of the LCD device 3 of the portable computer 1 of the so-called laptop type in the present embodiment usually has an A4 size of Japanese Industrial Standards (JIS), but the present invention can be applied to an electronic apparatus provided with a display device in which a display unit with a display screen having a larger size such as 15 and 17 types is used. The display unit of the display device is not limited to the LCD unit, and the present invention can also be applied to display devices in which known display units such as a cathode ray tube, plasma display and organic light emitting display are used.

The stepped portion 66c disposed on the connecting portion 61 secures a large deformation/deflection of the connecting portion 61 without increasing the protruded dimension of the bracket 60 from each of the right and left side portions of the frame 54 of the LCD unit 50. Therefore, if a large deformation/deflection of the connecting portion 61 can be secured without increasing the protruded dimension of the bracket 60 from each of the right and left side portions of the frame 54 of the LCD unit 50, another structure can also be used instead of the stepped portions 66c.

Since the brackets 60 are attached to only the right and left side portions of the frame 54 of the LCD unit 50 in the above-described embodiment, the center of the display screen 52 of the LCD unit 50 can be located at the predetermined position on the support wall 30a of the back cover 30, that is the center of the opening 40b of the mask 40 only in the horizontal direction extending along the display screen 52 and intersecting with the longitudinal direction of the connecting portion 61 of the bracket 60. However, if one pair of brackets 60 are attached to only upper and lower side portions of the frame 54 of the LCD unit 50 while the longitudinal directions of the connecting portions 61 of the paired brackets 60 are coincide with the extending directions of the upper and lower side portions, the center of the display screen 52 of the LCD unit 50 can be located at the predetermined center of the support wall 30a of the back cover 30, that is the center of the opening 40b of the mask 40, in the vertical direction extending along the display screen 52 and intersecting with the longitudinal direction of the connecting portion 61 of the bracket 60.

Furthermore, one pair of brackets 60 are attached to the right and left side portions of the frame 54 of the LCD unit 50 while the longitudinal directions of the connecting portions 61 of the paired brackets 60 are coincide with the extending directions of the right and left side portions, and another pair of brackets 60 can also be attached to the upper and lower side portions while the longitudinal directions of the connecting portions 61 of the paired brackets 60 are coincide with the extending directions of the upper and lower side portions. In this case, the center of the display screen 52 of the LCD unit 50 can be located at the predetermined center of the support wall 30a of the back cover 30, that is the center of the opening 40b of the mask 40, not only in the horizontal direction extending along the display screen 52 and intersecting with the longitudinal directions of the connecting portions 61 of the paired brackets 60 but also in the vertical direction extending along the display screen 52 and intersecting with the longitudinal directions of the connecting portions 61 of the other paired brackets 60.

Moreover, even in a case that the LCD unit is not rectangular, if one pair of brackets 60 are attached to two portions on the LCD unit with sandwiching the display screen by the two portions, technical advantages similar to those of the above-described embodiment can also be obtained in a direction extending along the display screen and intersecting with the longitudinal directions of the connecting portions 61 of the brackets 60.

Furthermore, if a plurality of pairs of brackets 60 are disposed on a plurality of pairs of portions on the LCD unit with each pair of portions sandwiching the display screen between them, technical advantages similar to those of the above-described embodiment can also be obtained in a direction extending along the display screen and intersecting with the longitudinal directions of the connecting portions 61 of each paired brackets 60.

In the present embodiment, it has been described that the electronic apparatus is the portable computer 1 of the laptop type, but the present invention can also be applied to the other electronic apparatuses with the display devices using various known type display units such as the cathode ray tube, plasma display and organic light emitting display, such as a portable computer of a desk top type, a cellular phone, and a portable DVD player.

Additional advantages and modifications will readily occur to those skilled in the art. Therefore, the invention in its broader aspects is not limited to the specific detail and representative embodiment shown and described herein. Accordingly, various modifications may be made without departing from the spirit or scope of the general inventive concept as defined by the appended claims and their equivalents.

What is claimed is:

1. A display device comprising:
a housing having a support wall and an opening opposite to the support wall;
a display unit provided in the housing, and having a display screen exposed through the opening; and
one pair of brackets provided between lateral sides of the display main unit,
each of the pair of brackets including:
a pair of first portions fixed to the display unit;
a connecting portion connecting the pair of first portions; and
a second portion provided on the connecting portion and fixed to the housing,
wherein the connecting portion being elastically deformable between a side of the display unit and the housing.

2. A display device according to claim 1, wherein the two first portions of each of the pair of brackets are disposed on opposite ends of the connecting portion in the longitudinal direction, and the one second portion is disposed in a center of the connecting portion between the two first portions in the longitudinal direction.

3. A display device according to claim 1, wherein the second portion of each of the pair of brackets is fixed to the predetermined position on the support wall.

4. A display device according to claim 1, wherein the connecting portion of each of the pair of brackets includes two opposite end parts corresponding to the two first portions and vicinities thereof, and a middle part positioned between two opposite end parts, and
the middle part is positioned on the outsides of the two opposite end parts in the direction extending along the display screen of the display unit and intersecting with the longitudinal direction, with respect to a portion in which each of the pair of brackets is disposed on the display unit.

5. A display device according to claim 4, wherein the connecting portion of each of the pair of brackets further includes stepped portions between the middle part and the two opposite end parts,
the stepped portions protrude outward from the two opposite end parts with respect to the portion of the display unit, on which each of the pair of brackets is disposed, in the direction extending along the display screen of the display unit and intersecting with the longitudinal direction, and
the middle part is positioned on the outsides of the two opposite end parts by the stepped portions in the direction extending along the display screen of the display unit and intersecting with the longitudinal direction.

6. A display device according to claim 1, wherein each of the pair of brackets further includes third portions on opposite ends of the connecting portion of each bracket in the longitudinal direction.

7. A display device according to claim 6, wherein the third portions on the opposite ends of the connecting portion of each bracket are disposed on the outsides the first portions in the longitudinal direction of the connecting portion of each of the pair of brackets.

8. A display device according to claim 6, wherein the third portions are fixed to predetermined positions on the support wall.

9. A display device according to claim 6, wherein the connecting portion of each of the pair of brackets includes two opposite end parts corresponding to the two first portions and vicinities thereof, and a middle part positioned between two opposite end parts, and
the middle part is positioned on the outsides of the two opposite end parts in the direction extending along the display screen of the display unit and intersecting with the longitudinal direction, with respect to a portion in which each of the pair of brackets is disposed on the display unit.

10. A display device according to claim 9, wherein the connecting portion of each of the pair of brackets further includes stepped portions between the middle part and the two opposite end parts,
the stepped portions protrude outward from the two opposite end parts with respect to the portion of the display unit, on which each of the pair of brackets is disposed, in the direction extending along the display screen of the display unit and intersecting with the longitudinal direction, and
the middle part is positioned on the outsides of the two opposite end parts by the stepped portions in the direction extending along the display screen of the display unit and intersecting with the longitudinal direction.

11. An electronic apparatus comprising:
a main body assembly including a data processing device; and
a display device displaying data processed by the data processing device,
the display device comprising:
a housing having a support wall and an opening opposite to the support wall;
a display unit provided in the housing, and having display screen exposed in the opening; and
one pair of brackets provided between lateral sides of the display unit,
each of the pair of brackets including a pair of first portions fixed to the display unit;
a connecting portion connecting the pair of first portions; and
a second portion provided on the connecting portion and fixed to the housing,
wherein the connecting portion being elastically deformable between a side of the display unit and the housing.

12. An electronic apparatus according to claim 11, wherein the two first portions of each of the pair of brackets are disposed on opposite ends of the connecting portion in the longitudinal direction, and the one second portion is disposed in a center of the connecting portion between the two first portions in the longitudinal direction.

13. An electronic apparatus according to claim 11, wherein the second portion of each of the pair of brackets is fixed to the predetermined position on the support wall.

14. An electronic apparatus according to claim 11, wherein the connecting portion of each of the pair of brackets includes two opposite end parts corresponding to the two first portions and vicinities thereof, and a middle part positioned between two opposite end parts, and the middle part is positioned on the outsides of the two opposite end parts in the direction extending along the display screen of the display unit and intersecting with the longitudinal direction, with respect to a portion in which each of the pair of brackets is disposed on the display unit.

15. An electronic apparatus according to claim 14, wherein the connecting portion of each of the pair of brackets further includes stepped portions between the middle part and the two opposite end parts, the stepped portions protrude outward from the two opposite end parts with respect to the portion of the display unit, on which each of the pair of brackets is disposed, in the direction extending along the display screen of the display unit and intersecting with the longitudinal direction, and the middle part is positioned on the outsides of the two opposite end parts by the stepped portions in the direction extending along the display screen of the display unit and intersecting with the longitudinal direction.

16. An electronic apparatus according to claim 11, wherein each of the pair of brackets further includes third portions on opposite ends of the connecting portion of each bracket in the longitudinal direction.

17. An electronic apparatus according to claim 16, wherein the third portions on the opposite ends of the connecting portion of each bracket are disposed on the outsides the first portions in the longitudinal direction of the connecting portion of each of the pair of brackets.

18. An electronic apparatus according to claim 16, wherein the third portions are fixed to predetermined positions on the support wall.

19. An electronic apparatus according to claim 16, wherein the connecting portion of each of the pair of brackets includes two opposite end parts corresponding to the two first portions and vicinities thereof, and a middle part positioned between two opposite end parts, and the middle part is positioned on the outsides of the two opposite end parts in the direction extending along the display screen of the display unit and intersecting with the longitudinal direction, with respect to a portion in which each of the pair of brackets is disposed on the display unit.

20. An electronic apparatus according to claim 19, wherein the connecting portion of each of the pair of brackets further includes stepped portions between the middle part and the two opposite end parts, the stepped portions protrude outward from the two opposite end parts with respect to the portion of the display unit, on which each of the pair of brackets is disposed, in the direction extending along the display screen of the display unit and intersecting with the longitudinal direction, and the middle part is positioned on the outsides of the two opposite end parts by the stepped portions in the direction extending along the display screen of the display unit and intersecting with the longitudinal direction.

\* \* \* \* \*